(12) United States Patent
Ramage et al.

(10) Patent No.: US 6,874,734 B2
(45) Date of Patent: *Apr. 5, 2005

(54) FLUID LOADING SYSTEM

(75) Inventors: Lee Ramage, Medford, OR (US); Alan B. MacDonald, Rogue River, OR (US); Rory D. Parker, Medford, OR (US)

(73) Assignee: Erickson Air-Crane Incorporated, Central Point, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/705,747

(22) Filed: Nov. 10, 2003

(65) Prior Publication Data

US 2005/0045770 A1 Mar. 3, 2005

Related U.S. Application Data

(63) Continuation of application No. 09/803,227, filed on Mar. 9, 2001, now Pat. No. 6,644,595.
(60) Provisional application No. 60/188,547, filed on Mar. 10, 2000.

(51) Int. Cl.$^7$ .................................................. B64D 1/00
(52) U.S. Cl. ...................... 244/136; 169/53; 239/171
(58) Field of Search .......................... 244/136; 169/53; 239/171

(56) References Cited

U.S. PATENT DOCUMENTS

| | | | |
|---|---|---|---|
| 1,609,762 | A | 12/1926 | Morgan |
| 3,442,334 | A | 5/1969 | Gousetis |
| 3,710,868 | A | 1/1973 | Chadwick |
| 3,714,987 | A | 2/1973 | Mattson |
| 3,759,330 | A | 9/1973 | Rainey et al. |
| 3,897,829 | A | 8/1975 | Eason |
| 4,172,499 | A | 10/1979 | Richardson et al. |
| 4,474,350 | A | 10/1984 | Hawkshaw |
| 5,451,016 | A | 9/1995 | Foy et al. |
| 5,967,462 | A | 10/1999 | Foster et al. |
| 6,209,593 | B1 | 4/2001 | Nichols, Sr. |

FOREIGN PATENT DOCUMENTS

FR    2512775    9/1981

*Primary Examiner*—J. Woodrow Eldred
(74) *Attorney, Agent, or Firm*—Kolisch Hartwell, P.C.

(57) ABSTRACT

A pump system for loading fluid into a tank onboard a translating aircraft includes a substantially rigid tube member having a diving device on the distal end of the tube member. A strut structure may also be provided on a front face of the tube member. In use, the tube member is directed rearward relative to the translating aircraft so that splashing of fluid onto the underside of the aircraft is substantially avoided.

3 Claims, 6 Drawing Sheets

Fig. 9
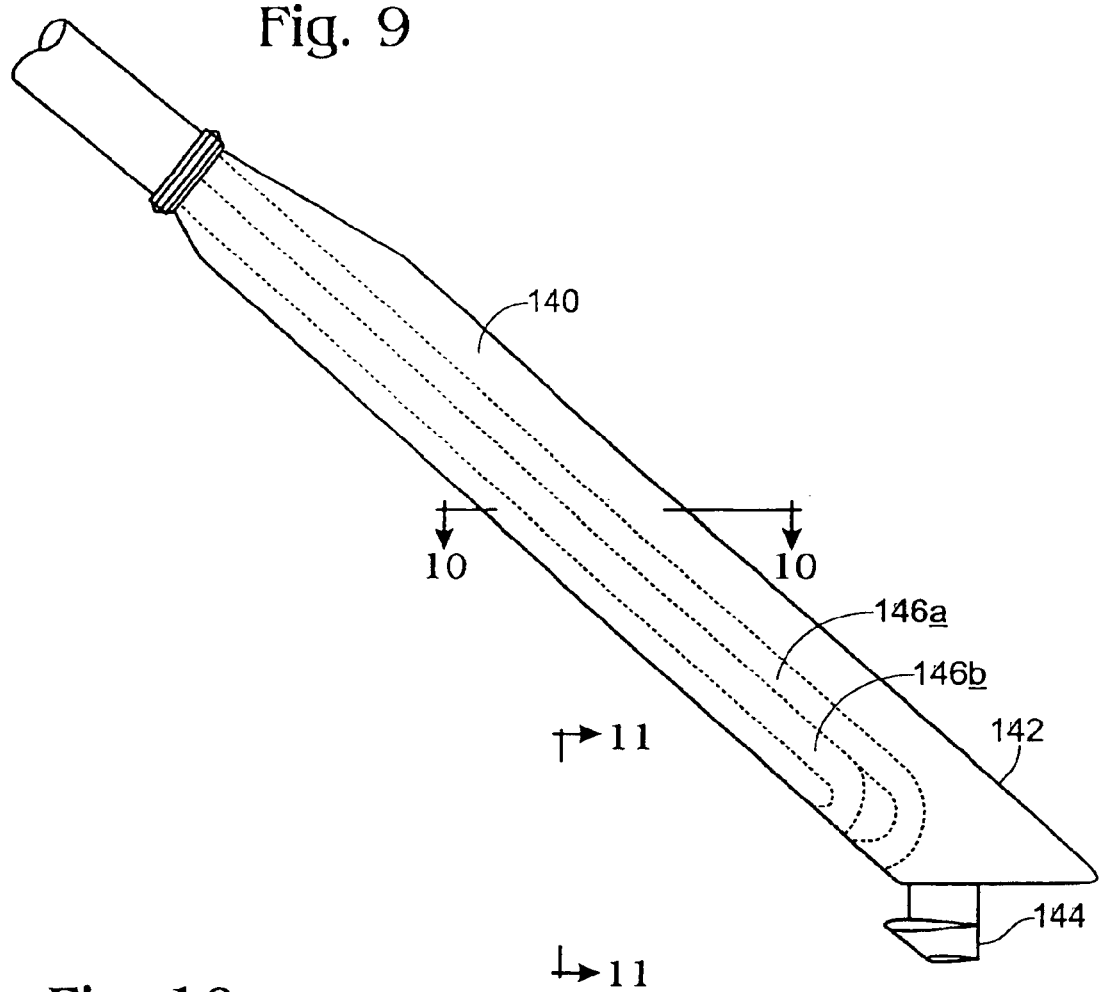
Fig. 10
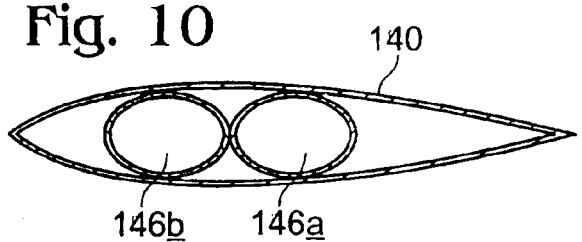
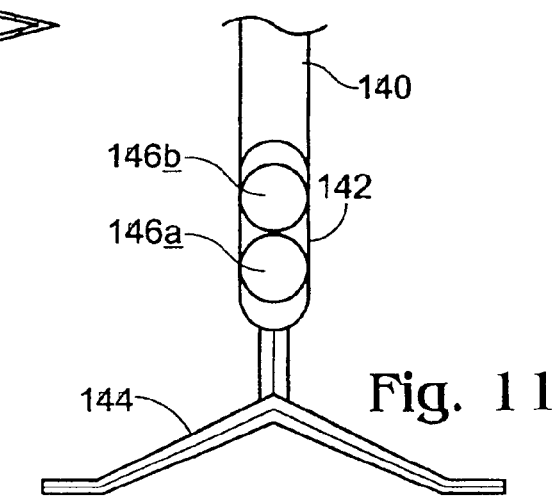
Fig. 11

FLUID LOADING SYSTEM

CROSS-REFERENCE TO RELATED APPLICATIONS

This is a continuation application of U.S. patent application Ser. No. 09/803,227 filed Mar. 9, 2001, now U.S. Pat. No. 6,644,595 which claims priority from U.S. Provisional Patent Application Ser. No. 60/188,547, filed Mar. 10, 2000, and all of which are hereby incorporated by reference.

FIELD OF THE INVENTION

The invention relates to pump devices for loading fluid into a tank. In particular, the invention involves conduit devices that can load fluid onto an aircraft, either fixed wing or rotocraft, from a fluid source such as a lake, river, reservoir, or ocean while remaining airborne.

BACKGROUND OF THE INVENTION

For many years, special aircraft have been designed and used to carry and deliver water to a fire. Helicopters or "helitankers" may be equipped with fire suppression systems that are capable of loading water from a source such as a lake or an ocean, into an onboard tank, and then transporting and dispensing the water onto a fire. Recently, the world-wide demand for helitanker fire fighting services has expanded. Helitanker fire fighting operations are now often required in areas where fresh water sources are scarce and salt water sources are abundant. Therefore, helitankers must be able to utilize sea water as a retardant without damaging aircraft components or compromising safety.

Conventional FAA approved hose or "snorkel" devices are unsatisfactory for use with salt water because these snorkels require the helicopter to hover at a level that results in rapid loss of power due to salt accumulation in the engines. For example, U.S. Pat. No. 3,897,829 discloses a helicopter equipped with a suction conduit that is designed to hang vertically below a hovering helicopter to load water from a source into an onboard tank. A significant problem with this type of water suctioning device is that downwash generated by the rotor causes water from the source to splash onto the underside of the helicopter. This can be a serious problem when the source contains salt water because the salt may cause parts of the helicopter to rust and corrode. Salt spray ingested into the engines can cause internal damage and result in a loss of power and eventually may cause total failure of one or both engines. Another problem with use of dangling hoses in ocean water is that the hose may bounce in and out of the water if the ocean is wavy or turbulent.

Accordingly, an object of the invention is to provide a system for loading fluid onto an aircraft from a salt water source without ingesting fluid into the aircraft engines.

Another object of the invention is to provide a conduit device for loading fluid into a tank on board an aircraft, in which the conduit device can remain partially stably submerged in the fluid source while the aircraft flies over the source at a ground speed sufficient to stay ahead of the spray generated by the rotor wash.

Another object of the invention is to provide a fluid loading system that may be versatily employed to load fluid from different types of sources, for example, oceans, lakes, rivers, and reservoirs, in varying shapes, depths, and degrees of salinity.

SUMMARY OF THE INVENTION

The invention provides a fluid loading and transport system for an aircraft. A substantially rigid tube member is connected to the aircraft in communication with the tank. The tube member is movable into a downward orientation for accessing a fluid source while the aircraft flies over the source and may be retracted in times of non-use.

One aspect of the invention relates to a fluid conduit device having a distal end equipped with a diving device, preferably in the form of an inverted hydrofoil, that substantially maintains the distal end of the conduit device below a surface of the water source while the aircraft flies over the water source.

Another aspect of the invention provides a fluid conduit device in which a tube member has a strut running along at least a portion of the length of the tube member. The strut is configured to stabilize a submerged distal end of the tube member while the aircraft moves over a fluid source.

Still another aspect of the invention involves a fluid conduit device in which a tube member is connected to an aircraft in communication with an onboard tank so that the tube member maintains a substantially rearward angular orientation when the aircraft translates over the fluid source and the distal end of the tube member is submerged.

The invention also provides a method of loading water onto a moving aircraft. Fluid is transferred from a source through a tube member into a tank on an aircraft by a pump or ram pressure generated by the forward velocity of the aircraft as it moves over the source. In a preferred procedure, the tube member is directed rearward relative to the aircraft's direction of travel. A distal portion of the tube member is maintained below the surface of the fluid source by providing a diving device near the distal portion.

BRIEF DESCRIPTION OF THE FIGURES

FIG. 9 is a partial, side view of an alternative embodiment of the invention showing a modified intake design.

FIG. 10 is a cross-sectional view through the conduit device of FIG. 9.

FIG. 11 is a partial front view of the distal end of the conduit device shown in FIG. 9.

DESCRIPTION OF THE INVENTION

The invention provides a system for loading fluid into a tank on an aircraft while the aircraft translates over the surface of the fluid source. Tests have demonstrated that a helicopter can fly at a loading level, for example, within about 10 feet of the water surface, at a speed of approximately 25 knots or greater, and thereby substantially avoid the ingestion of water into the engines. The in-flight loading system can be operated stably and safely in a turbulent or wavy salt water source such as an ocean without splashing significant amounts of salt water onto the underside of the aircraft. In a preferred application of the invention, a diving device such as a hydrofoil structure is used to stabilize a submerged distal end of a conduit while loading.

Figure 1:
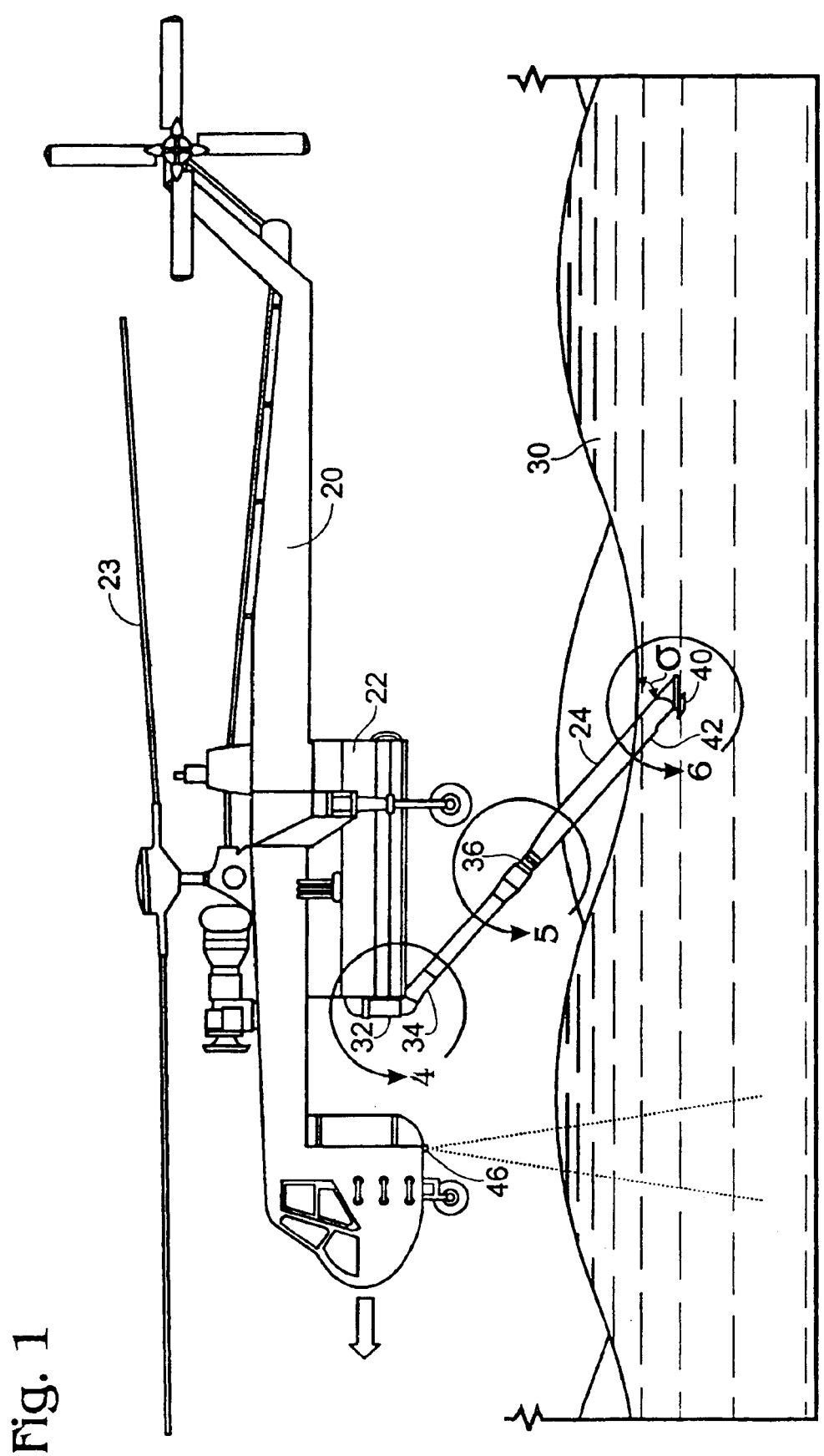
FIG. 1 is a side view of a helicopter equipped with a tank and associated fluid conduit device for loading water in to the tank.
Figure 2:
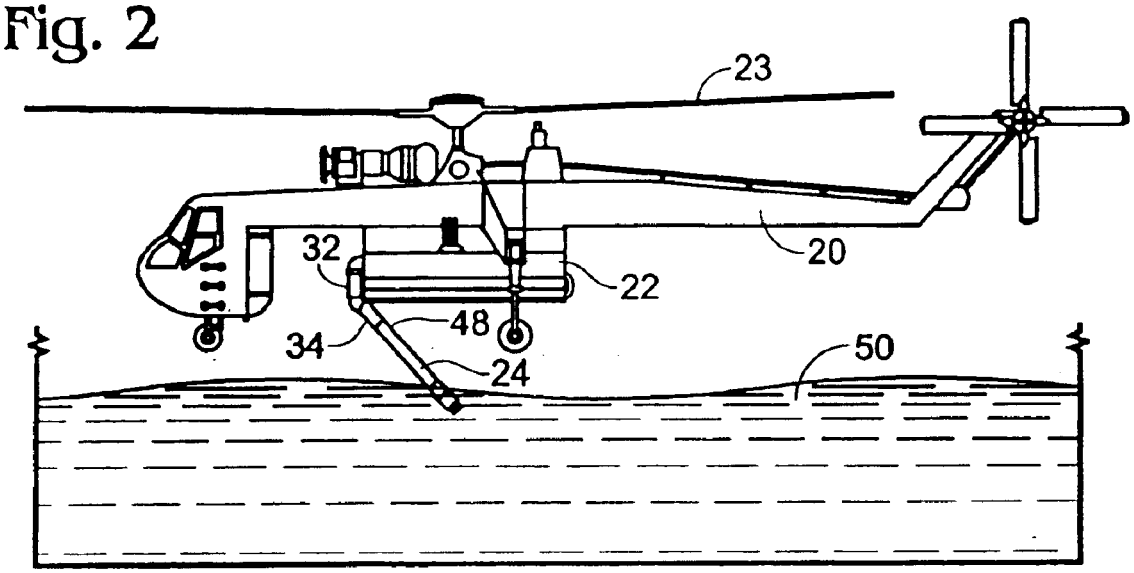
FIG. 2 is a side view of a helicopter equipped with a tank and a fluid conduit device consisting of the upper portion of the tube member shown in the system of FIG. 1.
Figure 3:
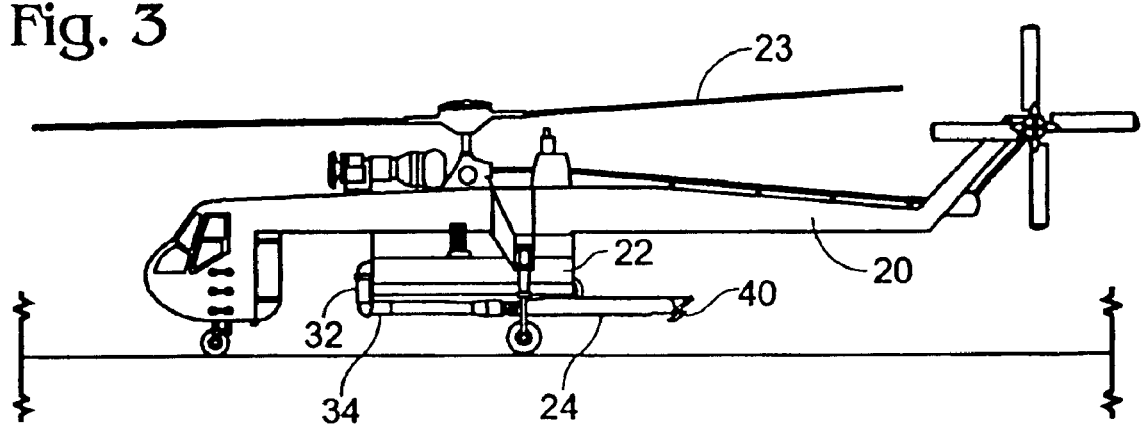
FIG. 3 is a side view of a helicopter equipped with a tank and fluid conduit device retracted against the underside of the helicopter in its non-use position.
Figure 4:
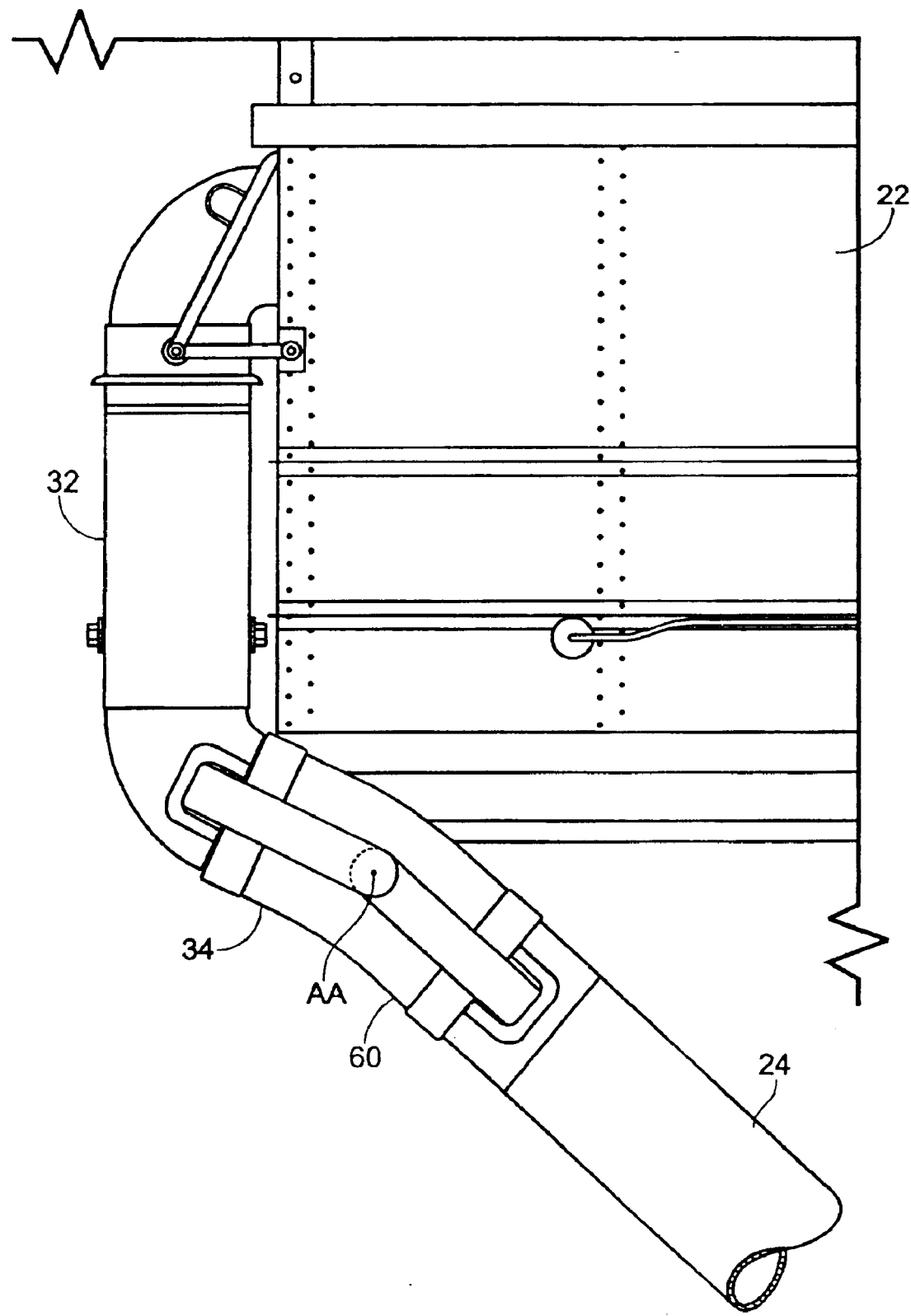
FIG. 4 is a partial, side view of the junction between the tube member and the tank of the system shown in FIG. 1.

FIGS. 1–6 illustrate details of a first embodiment of the invention. FIG. 1 shows helicopter 20 which is a conventional helicopter in many respects, except that it has been equipped with a fluid loading and containing system according to the invention. Tank 22 is connected to a central portion of the helicopter substantially directly below the main rotor 23. A front view of a similar tank is shown in FIG. 7. Substantially rigid tube member 24, also referred to as conduit structure or snorkel, is connected to the front end of tank 22. A distal end of tube member 24 is submerged in fluid source 30. Tube member 24 is connected to tank 22 by horizontal rotating union 32 and a vertical swivel joint 34, further details of which are shown in FIG. 4 and discussed below. Upper and lower portions of tube member 24 are connected in a central portion 36. The distal end of tube member 24 has a diving device in the form of an inverted hydrofoil structure or other diving device 40 which helps to maintain tube member 24 in the fluid source. A streamlined strut 42 is formed in the front face of tube member 24 for decreasing drag when helicopter 20 is moving forward, and also to at least partially stabilize lateral movement of tube member 24. Helicopter 20 is equipped with an altimeter device 46 for monitoring the relative height of helicopter 20 over the surface of fluid source 30. Information from the monitoring device is reported to the pilot/copilot in an appropriate instrument.

As shown in FIG. 1, tube member 24 is directed rearward at a preferred angle θ of approximately 40°. Diving device 40 is configured to stabilize the distal end of tube member 24 in the fluid at angle θ while helicopter 20 translates forward at approximately 40 knots. The system shown in FIG. 1 substantially avoids splashing of water on the underside of the helicopter by moving forward at a sufficient velocity, preferably about 25 knots or higher, so that water that is splashed up by rotor downwash occurs primarily behind the moving helicopter.

FIG. 2 shows a different application of the invention. Helicopter 20 and tank 22 are the same as illustrated and described in relation to FIG. 1. Tube member 24 has been shortened by detaching the bottom portion so that upper portion 48 of tube member 24 directly connects tank 22 to fluid source 50. Fluid source 50 may be a lake or reservoir that has a substantially calm or flat surface. The application shown in FIG. 2 may be appropriate when fluid source 50 is relatively fresh water (negligible salt content) so that fluid loading may be performed while helicopter 20 hovers.

FIG. 3 shows the same system of FIG. 1 in its retracted position. Tube member 24 is pulled up and secured against the underside of tank 22 by a winch (not shown) onboard helicopter 20.

An enlarged view of the joinder mechanism between tube member 24 and tank 22 is shown in FIG. 4. Horizontal rotating union 32 allows tube member 24 to rotate around an axis that is substantially perpendicular to the surface of the fluid source, and perpendicular to the direction of travel. Vertical swivel joint 34 permits tube member 24 to rotate around axis AA which is perpendicular to the figure. Vertical swivel joint 34 permits movement of tube member 24 between the use position, as shown in FIG. 1, and the non-use position, as shown in FIG. 3. Outer skin 60 of vertical swivel joint 34 is flexible to permit movement of the joint.

Figure 5:
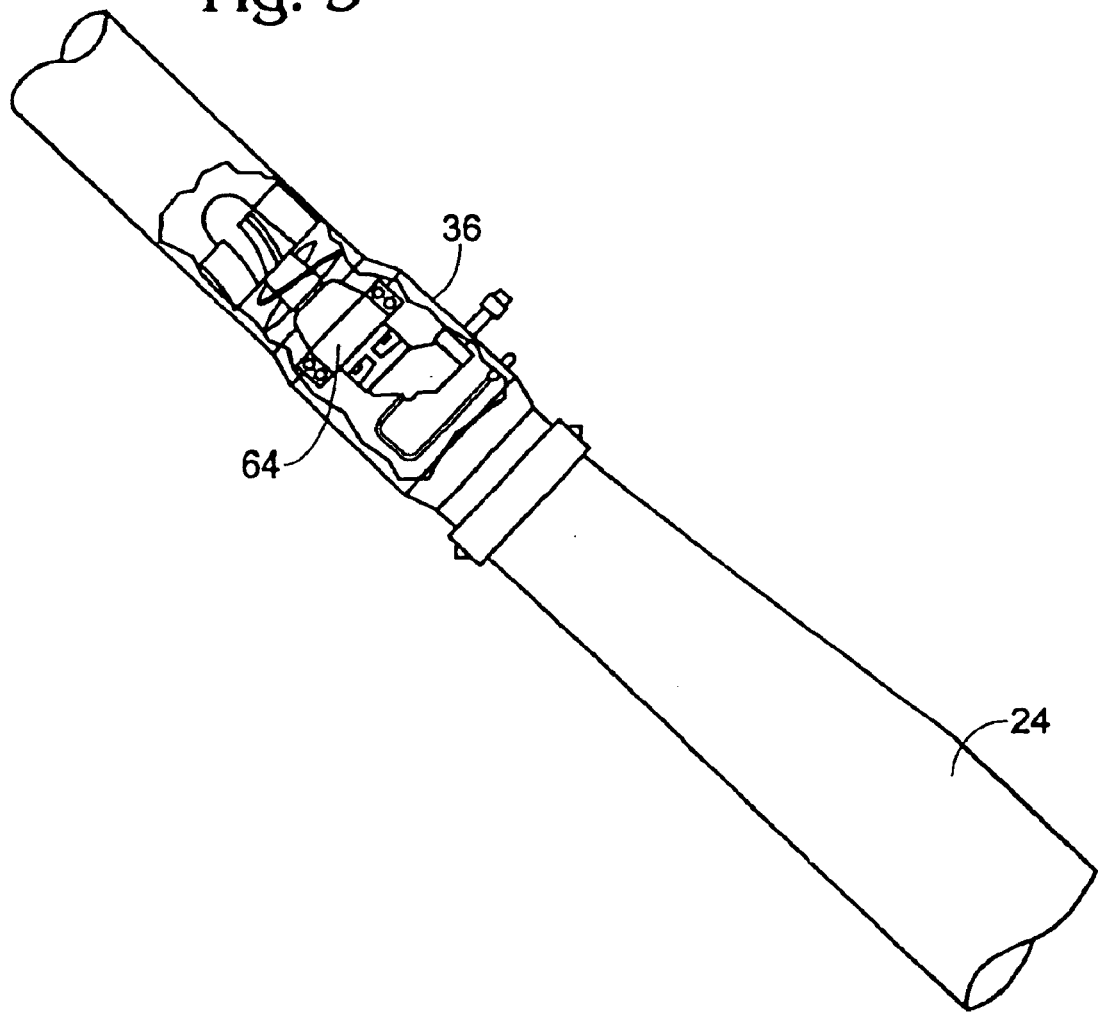
FIG. 5 is a partial, cut-away view of a central portion of the tube member shown in the system of FIG. 1.

In FIG. 5 the drawing is cut-away in central portion 36 of tube member 24 to show an optional pump device 64 that is contained inside tube member 24. When the helicopter translates forward with tube member 24 submerged in a water source, even without any assistance from pump device 64, a ram effect is observed which naturally pressures water from the fluid source up through tube member 24 into tank 22. Pump device 64 may be used to increase the rate of fluid loading.

Figure 6:
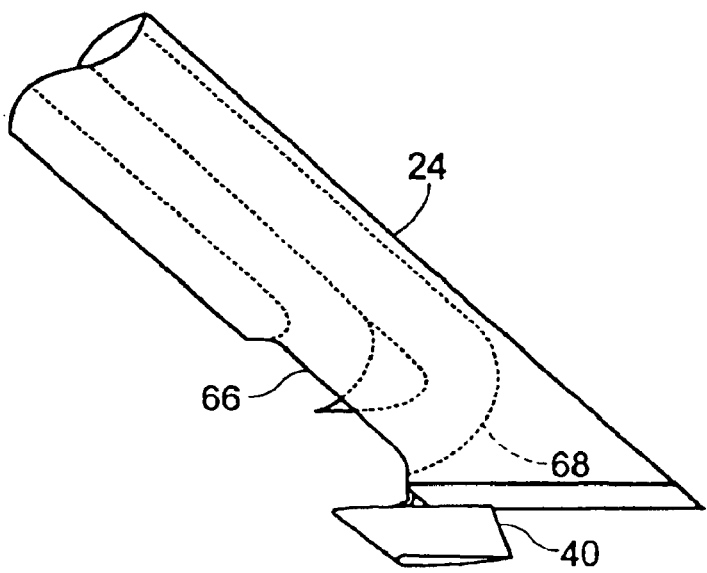
FIG. 6 is a partial, side view of the distal portion of the tube member in the system of FIG. 1.
Figure 7:
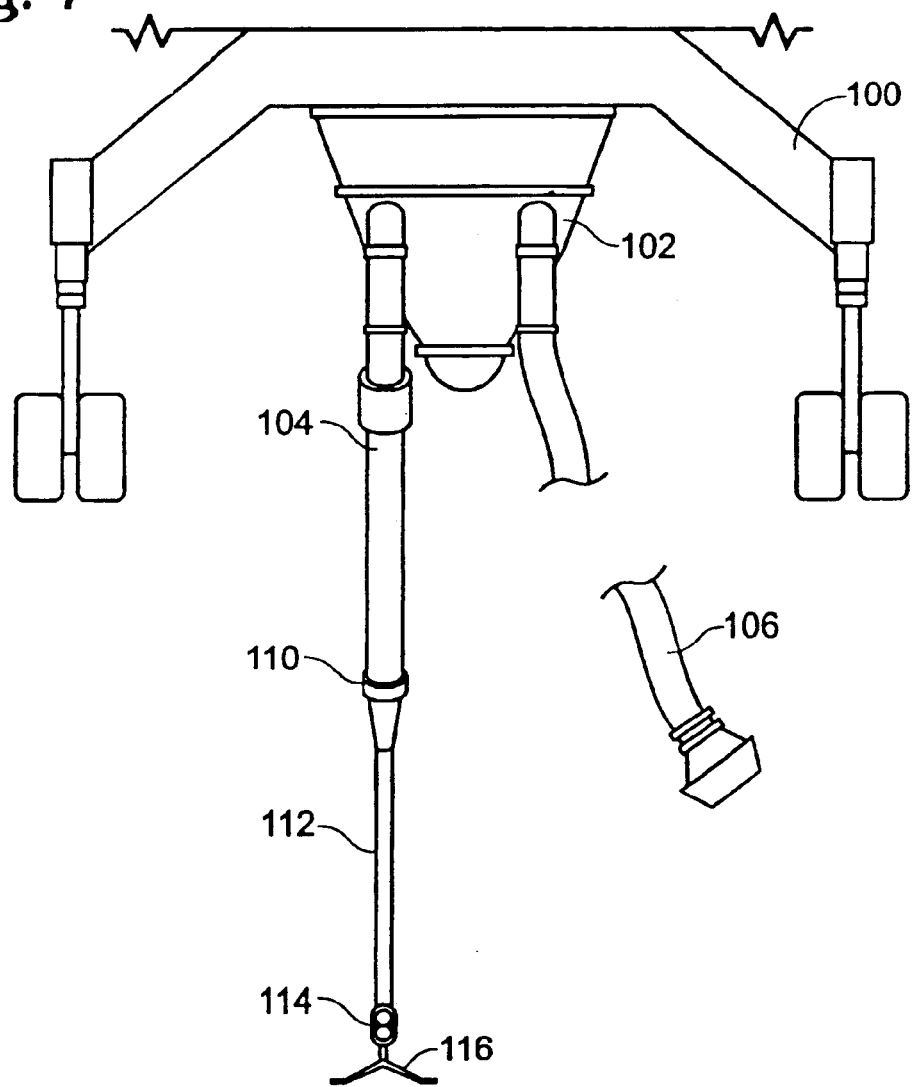
FIG. 7 is a partial, front view of a preferred embodiment of the invention suspended from a tank on the underside of a helicopter.

FIG. 6 shows the distal end of tube member 24. Diving device 40 is configured to retain and stabilize the desired orientation of tube member 24 in the fluid source as the helicopter translates forward. Water inlet 66 is provided on the front face of tube member 24 for receiving and channeling water into tube member 24. Internal volutes 68 are shown in dashed lines, and is provided to smoothly redirect in-flowing fluid up into tube member 24 toward tank 22.

A preferred embodiment of the invention is illustrated in FIG. 7. Helicopter 100 has a tank 102 for carrying water from a source such as an ocean, to a fire. Two different conduit devices are connected to the front end of tank 102. Rigid conduit 104 is connected to tank 102 on one side of the front end of tank 102. Conduit 104 is designed primarily for accessing fluid from a salt water or a fresh water source while in forward motion. Flexible hose conduit 106 is connected to the other side of the front end of tank 102, and is used primarily for accessing fluid from a fresh water source while helicopter 100 hovers. Rigid conduit 104 is substantially the same as the one described in relation to FIG. 1, except that conduit 104 has no internal pump device located in mid-portion 110. When the distal end of conduit 104 is submerged and moving forward in the water at a velocity of, for example, 25 knots, a substantial ram effect pressures water up through conduit 104 into tank 102 without any additional pump mechanism. Experiments have shown that conduit 104 can load water into tank 102 at a rate of approximately 2,000 gallons in 28 seconds while translating forward at a velocity of approximately 35 knots, without any additional pumping mechanism.

The front view of conduit 104 in FIG. 7 also illustrates the narrow front profile of lower portion 112 of conduit 104. The narrow front profile streamlines the portion of conduit 104 that is submerged in the water and minimizes drag or water resistance during loading. Intake 114 channels fluid into two internal tubes which extend on up through conduit 104. Diving device 116 is connected to the distal tip of conduit 104 in an orientation that maintains submersion of conduit 104 at a desired angle and depth while loading water into tank 102.

It is advantageous to provide two types of conduits or snorkels for maximum versatility. The rigid conduit is most desirable when loading fluid from a salt water source when it is particularly important to avoid ingestion of salt water into the helicopter engines. Other times it may be desirable to use the flexible conduit, for example, when loading from a fresh water source or a source that is not large enough to fly over while loading.

Figure 8:
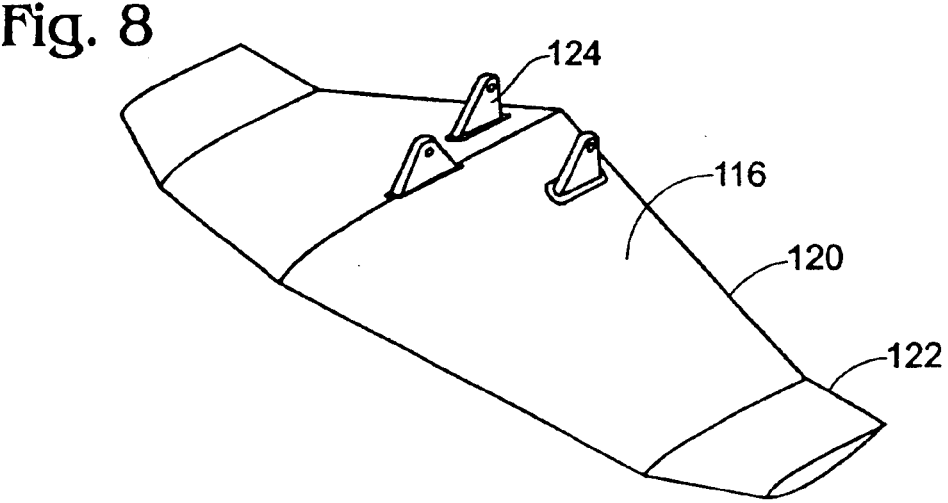
FIG. 8 is a perspective view of the diving device that is mounted on the distal end of the conduit device shown in FIG. 7.

FIG. 8 shows a perspective view of diving device 116. Diving device 116 has a pair of substantially planar shoulder members 120 which taper as they extend down and generally outward on opposite sides of conduit 104. Shoulder members 120 are then connected to lateral wing members 122. Three fastening flanges 124 may be provided on the top side of diving device 116 for connecting diving device 116 to conduit 104.

FIGS. 9–11 illustrate another embodiment of the invention in which the outer shape of the intake portion of the conduit is modified. Lower conduit portion 140 has a distal intake portion 142. A diving device 144 is connected to conduit 140 substantially as previously described. Internal tubes 146a and 146b present openings for receiving oncoming fluid as lower conduit portion 140 is submerged and translating forward. FIG. 10 shows a cross-section through lower conduit portion 140 and internal tubes 146a and 146b. FIG. 11 shows a front view of intake portion 142 where the openings of tubes 146a and 146b can be seen, in addition to the front profile of diving device 144.

Although the invention has been disclosed in its preferred forms, the specific embodiments thereof as disclosed and illustrated herein are not to be considered in a limiting sense, because numerous variations are possible. Applicants regard the subject matter of their invention to include all novel and nonobvious combinations and subcombinations of the various elements, features, functions, and/or properties disclosed herein. No single feature, function, element or property of the disclosed embodiments is essential. The following claims define certain combinations and subcombinations of features, functions, elements, and/or properties that are regarded as novel and nonobvious. Other combinations and subcombinations may be claimed through amendment of the present claims or presentation of new claims in this or a related application. Such claims, whether they are broader, narrower, equal, or different in scope to the original claims, also are regarded as included within the subject matter of applicants' invention.

We claim:

1. A pump system comprising an aircraft having an underside, a tank onboard the aircraft for containing fluid, a substantially rigid tube member, connected to the aircraft in communication with the tank, wherein the tube member is movable to a downward orientation for accessing a fluid source below the aircraft, and wherein the tube member is directed rearward relative to the aircraft when the tube member is in the downward orientation.

2. A method of loading water onto an aircraft comprising pumping fluid from a source through a substantially rigid tube member onto a tank on an aircraft, while the aircraft moves over the source, and directing the tube member rearward relative to the aircraft's direction of travel.

3. A method of loading water onto an aircraft comprising pumping fluid from a source through a substantially rigid tube member onto a tank on an aircraft, while the aircraft moves over the source, directing the tube member rearward relative to the aircraft's direction of travel, and further comprising the step of directing the tube member rearward relative to the aircraft's direction of travel.

* * * * *